United States Patent [19]

Faulkner et al.

[11] 4,350,516
[45] Sep. 21, 1982

[54] OUTLET FOR A GLASS MELTING FURNACE

[75] Inventors: Duane H. Faulkner, Battle Creek, Mich.; Vaughn C. Chenoweth, Hollansburg, Ohio

[73] Assignee: Guardian Industries Corporation, Northville, Mich.

[21] Appl. No.: 234,274

[22] Filed: Feb. 13, 1981

[51] Int. Cl.³ .............................................. C03B 5/26
[52] U.S. Cl. ...................................... 65/327; 65/356; 65/374.12
[58] Field of Search ............ 65/326, 327, 356, 374.12, 65/126, 325, 128; 13/6; 266/236

[56] References Cited

U.S. PATENT DOCUMENTS

| Re. 14,745 | 10/1919 | Hubbard et al. | 65/128 X |
| 1,603,160 | 10/1926 | Soubier | 65/325 X |
| 1,961,015 | 5/1934 | Stewart | 65/126 X |
| 3,659,029 | 4/1972 | de Bussy | 13/6 |
| 3,912,488 | 10/1975 | Sanford et al. | 65/326 |
| 3,983,309 | 9/1976 | Faulkner et al. | 13/6 |

FOREIGN PATENT DOCUMENTS 541058  5/1957  Canada ...................................... 13/6

Primary Examiner—Richard V. Fisher
Attorney, Agent, or Firm—Cullen, Sloman, Cantor, Grauer, Scott & Rutherford

[57] ABSTRACT

An electric glass-melting furnace has a cylindrical orifice block formed of a single block of refractory metal and an orifice through which molten glass flows out of the furnace. The inner end of the block extends into the melting zone portion of the furnace, while the remainder of the block extends through the furnace lining and wall, with the extreme outer tip being flush with the outer face of a water jacket which surrounds the outer end portions of the block. The block has a reduced diameter portion adjacent the outer end of the block, so that the outer end face exposes minimal surface area to outside atmosphere. The direct contact of the cooling jacket with the outer end of the block keeps the temperature of this small mass of block low enough to avoid oxidation. No protective atmosphere is required for the exterior tip of the block.

5 Claims, 2 Drawing Figures

OUTLET FOR A GLASS MELTING FURNACE

BACKGROUND AND SUMMARY OF THE INVENTION

A common configuration for small electric furnaces used for melting glass is a generally basin or bowl-shaped open-topped container lined with refractory bricks and having a central outlet orifice at the bottom through which molten glass may flow by gravity. The outlet is generally defined by an outlet structure having a vertical orifice in which a metering needle having a variable diameter is adjustably positioned to control the flow rate of the molten glass. Examples of such prior furnace constructions are published in U.S. Pat. Nos. 3,912,488 and 3,983,309 and in the prior art patents therein cited and discussed.

The extremely high temperatures involved in glass melting and the tendency of flowing molten glass to erode the surface of the confining chamber combine to create very substantial design and durability problems, particularly in the area of the furnace outlet. Temperatures within the furnace interior may be in the range of 2500 to 3000 degrees F. That environment requires that the outlet passageway or orifice for the molten glass be formed of a refractory metal capable of resisting the combined effect of the high temperatures and the erosion or deterioration which normally results from the flow of molten glass over its exterior surface and through its central orifice. The aforementioned patents recommend using molybdenum, tungsten, columbium, tantalum and alloys of such metals for the orifice block. Such materials, however, readily oxidize if exposed to ordinary atmosphere at temperatures in excess of about 700 degrees F. (in the case of molybdenum). The relatively great temperature differential which would therefore be required between the closely spaced inner and outer ends of the orifice block has heretofore precluded the use of a single block of material for this purpose.

Prior attempts to solve this problem, such as disclosed in the above-referenced patents, include the use of a two-stage orifice block comprising upper and lower portions of dissimilar materials spaced apart by an insulator, so that the lower portion, which is exposed to the atmosphere, can be kept at a lower temperature. The two-stage concept also permits selection of optimum materials having the required physical properties for the contrasting environments at the inner and outer ends of the outlet structure. Another solution involves flooding the area surrounding the exterior of the orifice block with an inert protective atmosphere, to isolate its heated exposed surface from contact with oxygen. Cooling jackets containing circulating water have also been used in conjunction with various orifice block configurations.

These earlier attempted solutions have not been entirely satisfactory. The use of multiple-stage orifice blocks wherein the lower or outer block is fabricated of platinum has been suggested in the prior art. However, platinum is an extraordinarily expensive material. Similarly, the use of protective atmospheres surrounding the outer end of the orifice block also introduces cost and space penalties and additional equipment to be maintained.

Accordingly, it is the principal object of the present invention to provide an improved orifice block for an electric glass-melting furnace which provides assured durability to withstand high temperatures, erosion and oxidation tendencies, while requiring minimal use of expensive materials and supplementary construction and equipment.

In summary, the present invention involves the use of an orifice block, preferably formed of a single piece, extending from the melting zone all the way through the wall and lining of the furnace, with its outer end substantially flush with a cooling jacket containing circulating water. The block is preferably formed of molybdenum, and the portions of the block at and adjacent to its outer end have a minimal external diameter to reduce the surface area exposed to the atmosphere and to reduce the mass of block at the outlet end which must be cooled. A shoulder in the exterior contour of the block forms a transition from the reduced diameter portion to the larger diameter of the main portion of the block. This shoulder, along with the periphery of the reduced diameter portion, is directly exposed to the cooling jacket, to provide maximum cooling for the outer end of the block. The combination of water cooling, minimal mass and the very minimal surface area exposed to the atmosphere eliminate any danger of oxidation at the exterior surface, and obviate the need for any protective atmosphere.

DETAILED DESCRIPTION OF THE INVENTION

Figure 1:
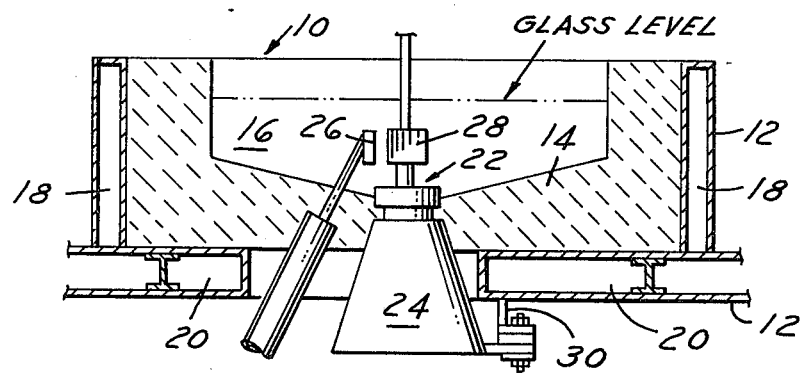
FIG. 1 is a cross-sectional elevation, in simplified form, of an electric glass-melting furnace embodying the present invention.

Referring to FIG. 1 of the drawings, glass melting furnace 10 generally comprises metal shell 12 surrounding the peripheral and lower portions, and refractory brick lining 14 which defines a bowl or basin-shaped melting chamber. The sides and bottom of the furnace are provided with cooling jackets 18, 20, respectively, through which water may be circulated by appropriate conduits and pumps (not illustrated). Furnace 10 is open-topped, so that the charge may be loaded from above, and molten glass is removed from the furnace through a centrally located orifice assembly 22 which is located and supported by support bowl 24 bolted to shell 12 through suitable brackets 30. The furnace is preferably heated by electrodes comprising three equally spaced molybdenum electrodes 26 and molybdenum central block 28. Electrodes 26 (only one of which is shown) enter melting chamber 16 from below through refractory lining 14, similar electrodes being spaced at 120 degree intervals around center block 28. Appropriate positioning and mounting brackets (not illustrated) are provided for securing the electrode support structure to the underside of the furnace. Block 28 is shaped as an equilateral triangle in plan view, so that a flat face is oriented parallel to each of the respective electrodes 26. The furnace charge is heated and melted by the Joule effect which results from electric current flowing between electrodes 26 and center block 28.

Figure 2:
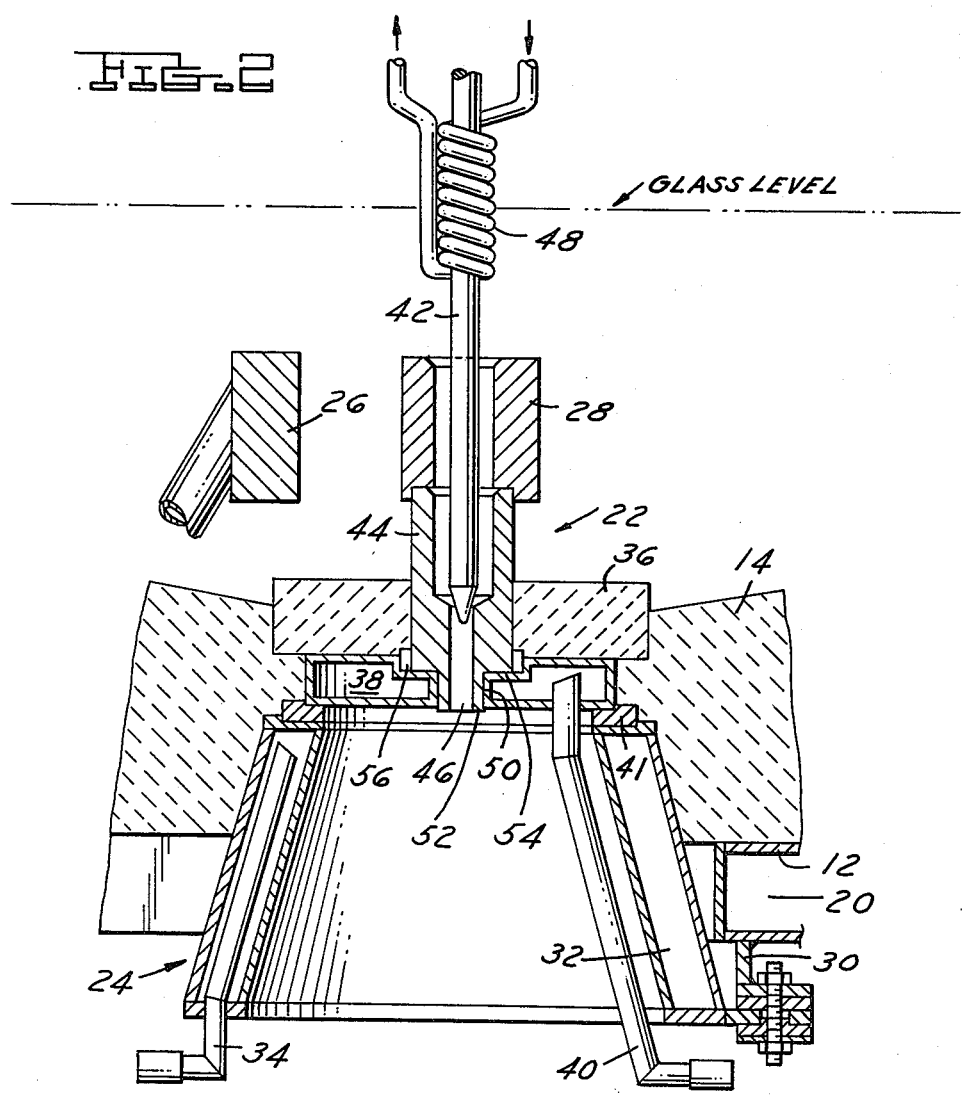
FIG. 2 is a substantially enlarged fragmentary cross-sectional elevation of the portion of the structure illustrated in FIG. 1.

Referring now to FIG. 2, which shows orifice assembly 22 and support bowl 24 on a greatly enlarged scale, support bowl 24 is preferably formed of stainless steel and is provided with water jacket 32 supplied with circulating cooling water through tube 34. A similar outlet tube (not illustrated) is provided for carrying return water from jacket 32. Support bowl 30 functions to support positioning block 36 which is made of refractory material and which is located within a recess formed in refractory lining 14 at the bottom center of melting zone 16. Annular block water jacket 38 is interposed between support bowl 24 and positioning block 36 and is provided with its own water supply tube 40. A similar tube (not illustrated) carries return water away from jacket 38. Appropriate spacers and seals 41 are provided between support bowl 24 and block water jacket 38, as shown in the drawing and as will be understood by those skilled in the art.

A vertically movable metering needle 42, preferably fabricated of molybdenum, passes downwardly through the furnace charge, through the hollow center block 28 and into hollow cylindrical orifice block 44. Appropriate mechanism (not illustrated) located above furnace 10 is provided for regulating the vertical position of metering needle 42, thereby to regulate the effective orifice established between the lower tip of needle 42 and outlet orifice 46 extending downwardly through orifice block 44. Water-filled cooling coils 48 surround the upper portion of metering needle 42 to maintain it at safe temperatures.

Orifice block 44 is preferably fabricated of molybdenum, although other refractory materials such as tungsten, columbium, tantalum and alloys thereof may be alternatively used. Molybdenum is a preferred material because of its strength and high temperature and its resistance to wear or erosion by the flowing molten glass. Because molybdenum tends to oxidize if exposed to the atmosphere above about 700 degrees F., the present invention incorporates a unique construction which precludes such oxidation. The outer or lower end portion 50 of orifice block 44 has a substantially reduced outer diameter, which is preferably selected as the minimum required to maintain a wall thickness adequate to preserve the structural integrity of the block. The wall thickness in this portion of the block can be significantly less than the remaining part of the block, where the orifice must have a greater diameter and the temperatures and erosion forces of the circulating molten glass are greater. In this way, the amount of surface area at outer face 52 of orifice block 44 is held to an absolute minimum. Similarly, the volume or mass of the lower end of block 44 is also significantly reduced. Because the volume is proportional to the square of the diameter, while the peripheral surface area is proportional to the first power of the diamter, a reduction in diameter produces a greater reduction of the volume or mass to be cooled than of the peripheral surface area in contact with the cooling jacket, thus greatly increasing the ability to cool the outer end of the block.

Shoulder 54 is defined by the point of transition from the larger outer diameter of the main portion of block 44 to the reduced diameter portion 50 adjacent its outer end. This shoulder 54 or transition surface area provides the additional benefit of an increased surface area directly exposed to the cooling influence of block water jacket 38, which is contoured and dimensioned to be in intimate contact with the surfaces of shoulder 54 and outer portion 50 of block 44. Seal 56 is provided between the portion of block 44 above shoulder 54 and water jacket 38.

By way of example, a melting furnace has been constructed utilizing an orifice block the main portion of which has a diameter of about four inches, a one and one-half inch diameter portion at outlet end 50, and an internal diameter of three-quarters of an inch.

The novel configuration and construction of orifice block 44 obviates any oxidation problem at its outer or lower end. The combination of the sharply reduced mass and exposed surface area of the lower end of the block with the direct and intimate contact with the cooling jacket along a substantial surface area permits the block temperature at outer face 52 to be maintained below that at which oxidation normally occurs. Therefore, no protective atmosphere is required.

This invention may be further developed within the scope of the following claims. Accordingly, the above specification is to be interpreted as illustrative of only a single operative embodiment of the present invention, rather than in a strictly limited sense.

We now claim:

1. In a furnace for melting glass or other high melting point materials, characterized by a refractory-lined vessel having a heat source for melting a charge of material placed within a melting zone within the vessel and outlet means establishing a channel through which molten material can flow from the melting zone through the vessel lining and wall to the exterior of the vessel, the improved outlet means construction which comprises:
    an orifice block formed of a single integral block of high melting point refractory material having an orifice through which the molten material may flow, the inner end of the orifice block extending into the melting zone within the vessel where such end of the block is directly in contact with and exposed to the heat of the molten charge, the inner end of said orifice being subjected to the eroding effect of molten material contacting said block as it flows through said orifice, said block extending through the vessel lining and wall so that its outer end is exposed to normal atmosphere on the exterior of the furnace, the portions of the orifice block at and adjacent to its outer end having a minimal cross-sectional area consistent with minimum safe wall-thickness thereof; and
    a cooling jacket surrounding and intimately contacting said minimal cross-sectional area portions at and adjacent to the outer end of said orifice block, said cooling jacket receiving a circulating flow of cooling fluid to reduce the temperature of the outer end of said orifice block below the point at which such block would oxidize.

2. The furnace of claim 1 wherein the outer end of said orifice block is substantially flush with the surrounding outer face of said cooling jacket.

3. The furnace of claim 1 wherein said outer end portions of said orifice block are cylindrical in cross-section, the outside diameter thereof abruptly changing at a position intermediate the ends of said block to define an outer end portion of minimal diameter to provide said minimal cross-sectional area and an intermediate portion of substantially greater diameter, said change in diameter creating a shoulder surface area interconnecting said outer end portion and said intermediate portion, said cooling jacket surrounding and intimately contacting the full peripheral surface of said outer end portion and said shoulder surface of said orifice block.

4. The furnace of claim 1 wherein said orifice block is fabricated from a material selected from the group consisting of molybdenum, tungsten, columbium, tantalum and alloys thereof.

5. In a furnace for melting glass or other high melting point materials, characterized by a refractory-lined vessel having a heat source for melting a charge of material placed within a melting zone within the vessel and outlet means establishing a channel through which molten material can flow from the melting zone through the vessel lining and wall to the exterior of the vessel, the improved outlet means construction which comprises:

an orifice block formed of a single integral block of high melting point refractory material having an orifice through which the molten material may flow, the inner end of the orifice block extending into the melting zone within the vessel where such end of the block is directly in contact with and exposed to the heat of the molten charge, said block extending through the vessel lining and wall so that its outer end is exposed to normal atmosphere on the exterior of the furnace;

the outer end portion of the orifice block at and adjacent to its outer end having a minimal cross-sectional area consistent with minimum safe wall thickness thereof;

the remaining portion of the orifice block between said outer end portions and said inner end having a significantly greater cross-sectional area than said minimal cross-sectional area, the lateral peripheral surface of the orifice block which interconnects said outer end and said remaining portions defining a transition surface;

an annular cooling jacket surrounding and intimately contacting the lateral peripheral surface of said outer end portion and also intimately contacting said transition surface, said cooling jacket receiving a circulating flow of cooling fluid to reduce the temperature of said outer end portions; and said outer end of said orifice block being substantially flush with the surrounding outer face of said cooling jacket.

* * * * *